US010712567B2

(12) United States Patent
Georgiou et al.

(10) Patent No.: US 10,712,567 B2
(45) Date of Patent: Jul. 14, 2020

(54) HOLOGRAPHIC DISPLAY SYSTEM

(71) Applicant: Microsoft Technology Licensing, LLC, Redmond, WA (US)

(72) Inventors: Andreas Georgiou, Cambridge (GB); Andrew Stephen Maimone, Duvall, WA (US); Joel Steven Kollin, Seattle, WA (US); Adrian Robert Leigh Travis, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 152 days.

(21) Appl. No.: 15/624,576

(22) Filed: Jun. 15, 2017

(65) Prior Publication Data
US 2018/0364482 A1   Dec. 20, 2018

(51) Int. Cl.
*G02B 27/01* (2006.01)
*G02B 27/00* (2006.01)

(52) U.S. Cl.
CPC ..... *G02B 27/0172* (2013.01); *G02B 27/0068* (2013.01); *G02B 27/0101* (2013.01); *G02B 27/0103* (2013.01); *G02B 2027/011* (2013.01); *G02B 2027/0123* (2013.01); *G02B 2027/0174* (2013.01)

(58) Field of Classification Search
CPC .............. G02B 27/0172; G02B 27/101; G02B 27/0068; G02B 27/0103; G02B 2027/0123; G02B 2027/0174; G02B 2027/011
See application file for complete search history.

(56) References Cited

U.S. PATENT DOCUMENTS

| 4,012,119 A | 3/1977 | Adams et al. |
| 4,826,300 A | 5/1989 | Efron et al. |
| 5,198,653 A | 3/1993 | Shen et al. |

(Continued)

FOREIGN PATENT DOCUMENTS

| DE | 102012100201 A1 | 9/2012 |
| EP | 2447787 A1 | 5/2012 |

(Continued)

OTHER PUBLICATIONS

"Stacked Flat Type Light Guide Panel" Tech Briefs Website, Available Online at http://www.techbriefs.com/component/content/article/14337, May 1, 2011, 4 pages.

(Continued)

*Primary Examiner* — Liliana Cerullo
(74) *Attorney, Agent, or Firm* — Alleman Hall Creasman & Tuttle LLP

(57) ABSTRACT

Examples are disclosed that relate to holographic display systems. One example provides a display system comprising a waveguide, a light source configured to introduce light into the waveguide at a controllable light input angle, and a holographic optical element (HOE) configured to outcouple from the waveguide light received from within the waveguide that meets an angular condition. The display system may further comprise a controller configured to control the light input angle and also to control a corrective component optically downstream of the HOE to correct for aberration of the light by the HOE based upon the light input angle.

16 Claims, 10 Drawing Sheets

(56) References Cited

U.S. PATENT DOCUMENTS

| | | |
|---|---|---|
| 5,331,446 A | 7/1994 | Hirai et al. |
| 5,715,337 A | 2/1998 | Spitzer et al. |
| 5,815,222 A | 9/1998 | Matsuda et al. |
| 5,907,416 A | 5/1999 | Hegg et al. |
| 6,043,910 A | 3/2000 | Slinger |
| 6,075,512 A | 6/2000 | Patel et al. |
| 6,404,538 B1 | 6/2002 | Chen et al. |
| 6,480,307 B1 | 11/2002 | Yang |
| 6,512,560 B2 | 1/2003 | Ohtake et al. |
| 6,512,566 B1 | 1/2003 | Yamagishi et al. |
| 6,690,447 B1 | 2/2004 | Stephenson et al. |
| 6,760,135 B1 | 7/2004 | Payne et al. |
| 7,068,910 B2 | 6/2006 | Duine et al. |
| 7,253,799 B2 | 8/2007 | Lee et al. |
| 7,845,841 B2 | 12/2010 | Sampsell |
| 7,876,405 B2 | 1/2011 | Ito et al. |
| 7,976,208 B2 | 7/2011 | Travis |
| 8,218,211 B2 | 7/2012 | Kroll et al. |
| 8,233,204 B1 | 7/2012 | Robbins et al. |
| 8,477,425 B2 | 7/2013 | Border et al. |
| 8,487,980 B2 | 7/2013 | Kroll et al. |
| 8,547,615 B2 | 10/2013 | Leister |
| 8,553,302 B2 | 10/2013 | Leister |
| 8,625,183 B2 | 1/2014 | Khan |
| 8,698,705 B2 | 4/2014 | Burke |
| 8,810,913 B2 | 8/2014 | Simmonds et al. |
| 9,122,244 B2 | 9/2015 | Lee et al. |
| 9,179,841 B2 | 11/2015 | Kim |
| 9,232,172 B2 | 1/2016 | Perkins et al. |
| 9,256,007 B2 | 2/2016 | Vasylyev |
| 9,335,604 B2 | 5/2016 | Popovich et al. |
| 9,341,846 B2 | 5/2016 | Popovich et al. |
| 9,406,166 B2 | 8/2016 | Futterer |
| 2003/0067760 A1 | 4/2003 | Jagt et al. |
| 2004/0108971 A1 | 6/2004 | Waldern et al. |
| 2004/0227703 A1 | 11/2004 | Lamvik et al. |
| 2005/0243258 A1 | 11/2005 | Oh |
| 2006/0028400 A1 | 2/2006 | Lapstun et al. |
| 2007/0019264 A1 | 1/2007 | Tanijiri et al. |
| 2008/0049450 A1 | 2/2008 | Sampsell |
| 2009/0244415 A1 | 10/2009 | Ide |
| 2010/0027289 A1 | 2/2010 | Aiki et al. |
| 2010/0053771 A1 | 3/2010 | Travis et al. |
| 2010/0056274 A1 | 3/2010 | Uusitalo et al. |
| 2010/0073744 A1 | 3/2010 | Zschau et al. |
| 2010/0103078 A1* | 4/2010 | Mukawa ............ G02B 27/0172 345/8 |
| 2010/0103485 A1 | 4/2010 | Haussler |
| 2010/0149073 A1 | 6/2010 | Chaum et al. |
| 2010/0157399 A1 | 6/2010 | Kroll et al. |
| 2010/0186818 A1 | 7/2010 | Okorogu et al. |
| 2012/0013988 A1 | 1/2012 | Hutchin |
| 2012/0062850 A1 | 3/2012 | Travis |
| 2012/0105310 A1 | 5/2012 | Sverdrup et al. |
| 2012/0105765 A1 | 5/2012 | Kawai et al. |
| 2012/0120467 A1 | 5/2012 | Gruhlke et al. |
| 2012/0188791 A1 | 7/2012 | Voloschenko et al. |
| 2013/0022222 A1 | 1/2013 | Zschau et al. |
| 2013/0050186 A1 | 2/2013 | Large et al. |
| 2013/0051730 A1 | 2/2013 | Travers et al. |
| 2013/0181888 A1 | 7/2013 | Kuriya et al. |
| 2013/0201094 A1 | 8/2013 | Travis et al. |
| 2013/0202297 A1 | 8/2013 | Martinelli et al. |
| 2013/0222384 A1 | 8/2013 | Futterer |
| 2013/0329301 A1 | 12/2013 | Travis |
| 2014/0033052 A1 | 1/2014 | Kaufman et al. |
| 2014/0063054 A1 | 3/2014 | Osterhout et al. |
| 2014/0104618 A1 | 4/2014 | Potsaid et al. |
| 2014/0104664 A1 | 4/2014 | Lee et al. |
| 2014/0104665 A1 | 4/2014 | Popovich et al. |
| 2014/0140653 A1 | 5/2014 | Brown et al. |
| 2014/0140654 A1 | 5/2014 | Brown et al. |
| 2014/0146394 A1 | 5/2014 | Tout et al. |
| 2014/0168735 A1 | 6/2014 | Yuan et al. |
| 2014/0300966 A1 | 10/2014 | Travers et al. |
| 2015/0016777 A1 | 1/2015 | Abovitz et al. |
| 2015/0036199 A1 | 2/2015 | Leister et al. |
| 2015/0085331 A1 | 3/2015 | Chae |
| 2015/0235448 A1 | 8/2015 | Schowengerdt |
| 2015/0277123 A1 | 10/2015 | Chaum et al. |
| 2015/0277375 A1 | 10/2015 | Large et al. |
| 2015/0378080 A1 | 12/2015 | Georgiou et al. |
| 2016/0170372 A1 | 1/2016 | Smithwick |
| 2016/0037146 A1 | 2/2016 | Mcgrew |
| 2016/0041393 A1 | 2/2016 | Inagaki |
| 2016/0070113 A1* | 3/2016 | Travis ................ G02F 1/1323 349/18 |
| 2016/0077338 A1 | 3/2016 | Robbins et al. |
| 2016/0077339 A1 | 3/2016 | Christmas et al. |
| 2016/0139402 A1 | 5/2016 | Lapstun |
| 2016/0195720 A1 | 7/2016 | Travis et al. |
| 2016/0238845 A1* | 8/2016 | Alexander ........... G03H 1/2645 |
| 2016/0327797 A1* | 11/2016 | Bailey ................ G02B 27/0172 |
| 2016/0377865 A1* | 12/2016 | Alexander ........... G03H 1/2645 345/8 |
| 2016/0379606 A1 | 12/2016 | Kollin et al. |
| 2017/0017083 A1* | 1/2017 | Samec ................ A61B 3/085 |
| 2017/0078652 A1 | 3/2017 | Hua et al. |

FOREIGN PATENT DOCUMENTS

| | | |
|---|---|---|
| GB | 2260203 A | 4/1993 |
| GB | 2461294 A | 12/2009 |
| GB | 2501754 A | 11/2013 |
| WO | 9735223 A1 | 9/1997 |
| WO | 9821612 A1 | 5/1998 |
| WO | 0172037 A1 | 9/2001 |
| WO | 03013151 A2 | 2/2003 |
| WO | 2008046057 A2 | 4/2008 |
| WO | 2008049917 A1 | 5/2008 |
| WO | 2008155563 A1 | 12/2008 |
| WO | 2012088478 A1 | 6/2012 |
| WO | 2012103559 A1 | 8/2012 |
| WO | 2013028687 A2 | 2/2013 |
| WO | 2014085734 A1 | 6/2014 |
| WO | 201415877 A1 | 9/2014 |
| WO | 2014167290 A1 | 10/2014 |
| WO | 2015032828 A1 | 3/2015 |
| WO | 2016046514 A1 | 3/2016 |
| WO | 2016105285 A1 | 6/2016 |
| WO | 2017069946 A1 | 4/2017 |

OTHER PUBLICATIONS

Serati, S. et al., "Advances in liquid crystal based devices for wavefront control and beamsteering", In Proceedings of Optics and Photonics 2005, Aug. 18, 2005, San Diego, CA, USA, 14 pages.

"100% Fill Factor White Paper", Boulder Nonlinear Systems, Inc., Available Online at http://www.auniontech.com/uploadfile/2014/01/100%20Fill%20Factor%20White%20Paper.pdf, Jan. 2008, 2 Pages.

Zschau E. et al., "Generation, encoding and presentation of content on holographic displays in real time", Three-Dimensional Imaging, Visualization, and Display 2010, vol. 7690. Apr. 2010, 14 pages.

Reichelt, S. et al., "Holographic 3-D Displays—Electro-holography within the Grasp of Commercialization", Advances in Lasers and Electro Optics, Apr. 2010, 29 pages.

Yaras, F. et al., "State of the Art in Holographic Displays: A Survey", Journal of Display Technology, vol. 6, No. 10, Oct. 2010, 12 pages.

Mirza, K. et al., "Key Challenges to Affordable See Through Wearable Displays: The Missing Link for Mobile AR Mass Deployment" Optinvent Website, Retrieved Online at http://www.optinvent.com/HUD-HMD-benchmark, Available as Early as Jun. 13, 2013, 8 pages.

"Spatial Light Modulators—XY Series", Boulder Nonlinear Systems, Inc., Retrieved Online at http://bnonlinear.com/pdf/XYseriesDS0909.pdf, Available as Early as Jul. 20, 2014, 12 pages.

Zhang, Z. et al., "Fundamentals of phase-only liquid crystal on silicon (LCOS) devices", Light: Science & Applications (2014) 3, Oct. 24, 2014, 10 pages.

(56) References Cited

OTHER PUBLICATIONS

Travis, A. et al., U.S. Appl. No. 14/589,513, "Virtual Image Display with Curved Light Path", filed Jan. 5, 2015, 32 pages.
Yeom, H. et al., "Design of holographic Head Mounted Display using Holographic Optical Element", Lasers and Electro-Optics Pacific Rim (CLEO-PR), vol. 3, Aug. 24, 2015, 10 pages.
Willekens, O. et al., "Paper No. S1.3: Lead Zirconate Titanate-Based Transmissive Liquid Crystal Lens Approach", SID Symposium Digest of Technical Papers, vol. 46, Iss. S1, Sep. 22, 2015, 1 page.
ISA European Patent Office, International Search Report and Written Opinion Issued in PCT Application No. PCT/US2015/068208, dated May 17, 2016, WIPO, 13 pages.
Pascotta, R., "Volume Bragg Gratings" Encyclopedia of Laser Physics and Technology, vol. 1, Jul. 31, 2016, 3 pages.
ISA European Patent Office, International Search Report and Written Opinion Issued in PCT Application No. PCT/US2016/039142, dated Dec. 9, 2016, WIPO, 17 pages.
IPEA European Patent Office, Second Written Opinion Issued in PCT Application No. PCT/US2015/068208, dated Dec. 14, 2016, WIPO, 4 pages.
IPEA European Patent Office, International Preliminary Report on Patentability Issued in PCT Application No. PCT/US2015/068208, dated Mar. 22, 2017, WIPO, 7 pages.
IPEA European Patent Office, Second Written Opinion Issued in PCT Application No. PCT/US2016/039142, dated Mar. 31, 2017, WIPO, 7 pages.
Travis, A., "Holographic Display" U.S. Appl. No. 14/921,864, filed Oct. 23, 2015, 38 pages.
Guenter, B. et al., "Foveated 3D Graphics", ACM Transactions on Graphics (TOG) 31, No. 6, Nov. 20, 2012, 10 pages.
ISA European Patent Office, International Search Report and Written Opinion Issued in PCT Application No. PCT/US2017/019231, dated May 26, 2017, WIPO, 14 pages.
ISA European Patent Office, International Search Report and Written Opinion Issued in PCT Application No. PCT/US2015/021922, dated Jun. 2, 2015, WIPO, 10 pages.
Huebschman, M. et al., "Dynamic holographic 3-D image projection", Optics Express, vol. 11, No. 5, Mar. 10, 2003, 9 pages.
Palima, D. et al., "Wave-guided optical waveguides", Optics Express, vol. 20, No. 3, Jan. 30, 2012, 11 pages.
Kress, B. et al. "A review of head-mounted displays (HMD) technologies and applications for consumer electronics", Photonic Applications for Aerospace, Commercial, and Harsh Environments IV, Proc. SPIE vol. 8720, May 31, 2013, 13 pages.
Chuan, S. et al., "Holographic projection using converging spherical wave illumination", In Proceedings of the 2013 Seventh International Conference on Image and Graphics, Jul. 26, 2013, Qingdao, China, 5 pages.
Bleha, W. et al., "Binocular Holographic Waveguide Visor Display", SID Symposium Digest of Technical Papers, vol. 45, No. 1, Jun. 1, 2014, 4 pages.
Yeom, H. et al., "3D holographic head mounted display using holographic optical elements with astigmatism aberration compensation", Optics Express 32025, vol. 23, No. 25, Dec. 3, 2015, 10 pages.

Oh, C. et al., "Achromatic diffraction from polarization gratings with high efficiency", Optics Letters, vol. 33, No. 20, Oct. 15, 2008, 3 pages.
SBGLab's channel, "SBG Labs Holographic Eye Adaptive Display", YouTube Website, Available Online at https://www.youtube.com/watch?v=XkmqKeGn4yo, Mar. 11, 2012, 1 page.
Kessler, D., "Optics of Near to Eye Displays (NEDs)", Kessler Optics & Photonics Solutions, Ltd., Feb. 19, 2013, 37 pages.
Lanman, D. et al., "Near-Eye Light Field Displays", In Proceedings of ACM SIGGRAPH 2013 Emerging Technologies, Jul. 21, 2013, Anaheim, CA, USA, 10 pages.
Goetz, G. A. et al., "Holographic display system for restoration of sight to the blind", Journal of Neural Engineering 10, No. 5, Oct. 2013, 23 pages.
"Composyt Light Labs", Retrieved Online at http://composyt.com/, Available as Early as Jan. 2, 2014, 1 page.
Burt, J., "Intel Buys Smart Eyewear Maker Composyt", eWeek Website, Available Online at http://www.eweek.com/blogs/first-read/intel-buys-smart-eyewear-maker-composyt, Jan. 21, 2015, 4 pages.
Laing, R., "Glass, what Glass? Intel snaps up Swiss eyewear startup", ZDNet Website, Available Online at http://www.zdnet.com/article/glass-what-glass-intel-snaps-up-swiss-eyewear-startup/, Jan. 21, 2015, 4 pages.
Kollin, J. et al., U.S. Appl. No. 14/754,451, "Holographic Near-Eye Display", filed Jun. 29, 2015, 42 pages.
Luminit, "Lunar EVA Holographic Display (LEVAD)", Research & Development for NASA, Available Online at http://uminitrd.com/NASA.html, Available as Early as Oct. 12, 2015, 4 pages.
Qu, W. et al., "Image magnification in lensless holographic projection using double-sampling Fresnel diffraction", Journal of Applied Optics, vol. 54, Iss. 34, Dec. 1, 2015, 4 pages.
Li, G. et al., "Holographic display for see-through augmented reality using mirror-lens holographic optical element", Optics Letters, vol. 41, No. 11, Article Published May 20, 2016, Journal Published Jun. 1, 2016, 4 pages.
Khorasaninejad, M. et al., "Metalenses at visible wavelengths: Diffraction-limited focusing and subwavelength resolution imaging", Science, vol. 352, Iss. 6290, Jun. 3, 2016, 6 pages.
Kaczorowski, A. et al., "Adaptive, spatially-varying aberration correction for real-time holographic projectors", Optics Express 15742, vol. 24, No. 14, Article Published Jul. 5, 2016, 15 pages.
Robbins, S. et al., U.S. Appl. No. 15/268,269, "Holographic Wide Field of View Display", filed Sep. 16, 2016, 40 pages.
Lee, S. et al., "See-through Light Field Displays for Augmented Reality", In Proceedings of SIGGRAPH Asia 2016 Virtual Reality meets Physical Reality: Modelling and Simulating Virtual Humans and Environments, Dec. 5, 2016, Macau, 2 pages.
Nahar, et al., "Efficient Free-Space Coupling to LMA-PCF by Aberration Correction", In Journal of IEEE Transactions on Components, Packaging and Manufacturing Technology, vol. 1, Issue 10, Oct. 2011, 6 pages.
"International Search Report and Written Opinion Issued in Patent Application No. PCT/US2018/034244", dated Nov. 27, 2018, 17 Pages.
"Invitation to Pay Additional Fees Issued in PCT Application No. PCT/US2018/034244", dated Aug. 10, 2018, 14 Pages.

\* cited by examiner

HOLOGRAPHIC DISPLAY SYSTEM

BACKGROUND

A near-eye display, such as a head-mounted display device, may be used to present immersive visual experiences.

SUMMARY

Examples are disclosed that relate to holographic display systems. One example provides a display system comprising a waveguide, a light source configured to introduce light into the waveguide at a controllable light input angle, and a holographic optical element (HOE) configured to outcouple light received from within the waveguide that meets an angular condition. The display system further comprises a controller configured to control the light input angle, and also to control a corrective component optically downstream of the HOE to correct for aberration of the light by the HOE based upon the light input angle.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
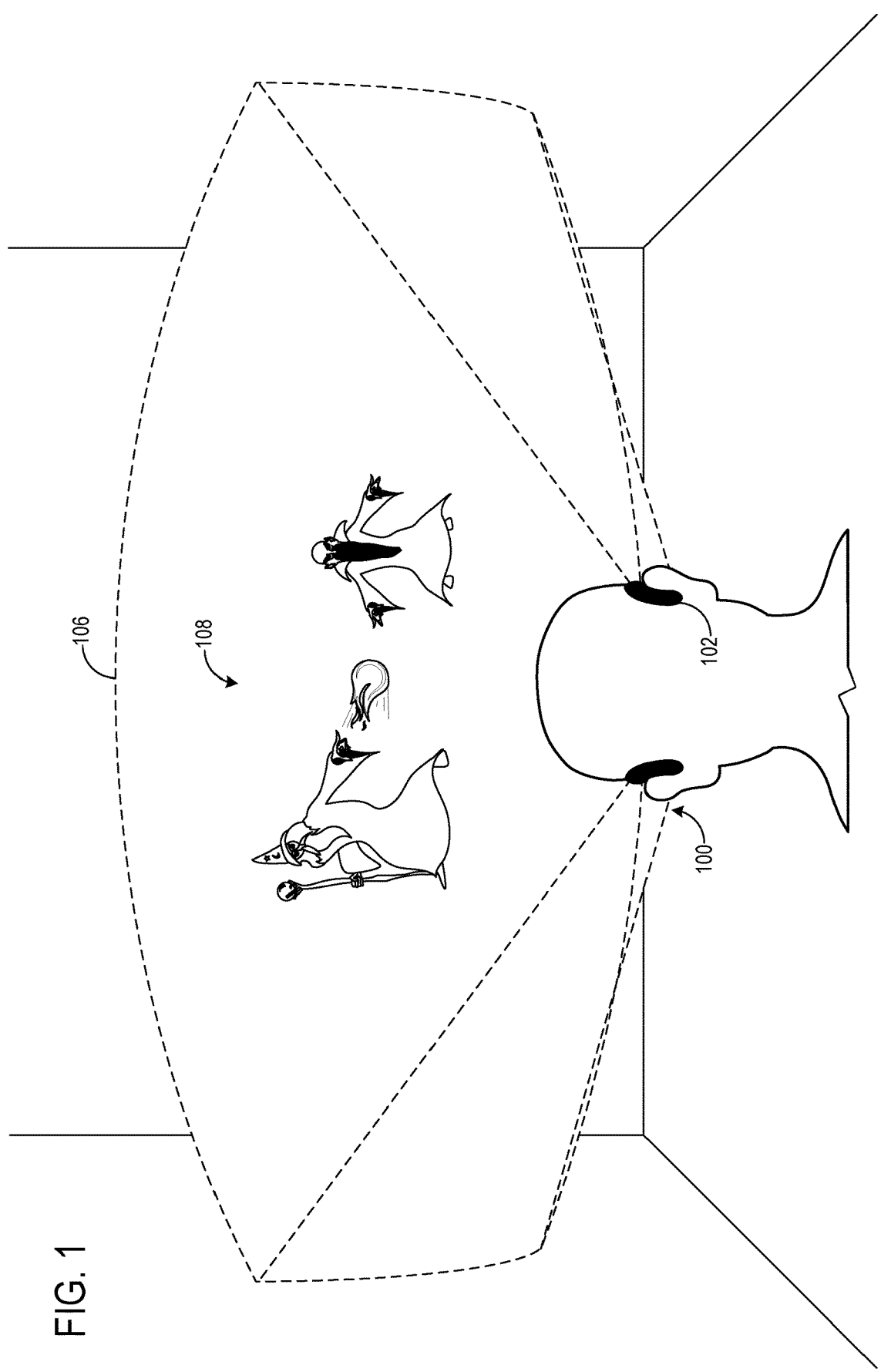
FIG. 1 shows an example head-mounted display device including a near-eye display (NED).

As described above, a head-mounted display (HMD) device may include a near-eye display (NED) to provide immersive imagery to wearers. An HMD device may combine virtual imagery generated by an NED with a view of the surrounding physical environment in a "mixed" or "augmented" reality configuration, or may replace at least a portion of a wearer's field of view with NED output in a "virtual reality" configuration. The NED may assume various configurations that enable its output of virtual imagery. For example, the NED may employ holographic optics to generate images.

Providing a large eyebox in which imagery is viewable, and achieving a wide field of view, are common design goals in a holographic NED. When configured with a holographic optical element (HOE), the NED may be designed to receive light that satisfies an angular selectivity condition—e.g., light incident within a specific range of angles that satisfies a Bragg condition of the HOE. Light incident in a subset of the range of angles is diffracted by the HOE toward a corresponding focal point in a coherent, focused manner. Light received outside of the subset but within the specific range of input angles, however, may exhibit aberration relative to the focal point when diffracted. An unfocused, dimmed, and/or otherwise lower quality image may result, in turn limiting the eyebox in which desired imagery is produced. While additional exit pupils may be provided with additional holographic optics such as a fanout grating, different aberration conditions may be associated with each exit pupil, which may become more severe as the effective eyebox is expanded. Further, light diffracted by the HOE may be limited to a single eye relief distance. Note that an HOE may be designed and fabricated to operate over a narrow or wide range of angles—i.e., with narrow or wide angular selectivity. Depending on the angular selectivity, the HOE may be replaced with another thick or thin hologram. These include diffractive optical elements (DOEs), kinoforms, volume Bragg gratings, surface Bragg gratings, switchable Bragg gratings, and/or other static or dynamic technologies that can act as a thin or thick volume hologram. "HOE" as used herein may refer to a range of diffractive components including but not limited to the aforementioned optical components.

Accordingly, example display systems of compact size that may display virtual imagery with a wide field of view in a wide effective eyebox are disclosed herein. One example display system includes a waveguide having a HOE to outcouple light from the waveguide toward a focal plane, a light source configured to control an angle of light input into the waveguide to thereby control an eyebox location, and a corrective component controllable to correct for aberration of light arising from the HOE as the angle is varied. Another example display system includes a HOE comprising different holograms each configured to diffract light from a waveguide toward a respective exit pupil. Each hologram is configured to diffract light from a corresponding range of incident light angles. Thus, by controlling the input angle of light introduced into a waveguide, light can be selectively directed to each exit pupil while avoiding aberrations from the HOE, since each hologram is separately corrected for the aberrations of its respective exit pupil.

FIG. 1 shows an example HMD device 100 in the form of a pair of wearable glasses 102 including an NED 104. NED 104 is configured as a virtual reality display with which substantially the entirety of the surrounding physical environment is occluded, and allows at least a portion of a user's field of view 106 to be replaced with virtual imagery presented by the NED. As an example, FIG. 1 shows virtual imagery 108 presented by NED 104 in field of view 106.

HMD device 100 includes a controller (not shown in FIG. 1) for controlling NED 104. Among other potential operations, the controller may drive NED 104 to control the display of virtual imagery. The controller may include a logic device and/or a storage device, examples of which are described below with reference to FIG. 10. In some examples, the controller may communicate with one or more devices remote from the HMD device.

The controller may interface with one or more sensors provided within or remotely from HMD device 100. The sensor(s) may include, but are not limited to, a microphone array, one or more outward facing image sensors, one or more inward facing image sensors (e.g., an eye/gaze tracking system), and an inertial measurement unit (IMU). As one example, the controller may use output from the IMU to adjust output from NED 104 that reflects movement of the wearer in a manner that the wearer feels present in the virtual environment displayed on the NED. As another example, the controller may cause display of a view of the surrounding physical environment on NED 104 captured via outward facing image sensors in a stereo arrangement, which may enable the determination of depth. In this example, NED 104 may present a mixed reality environment in which virtual imagery is superimposed over the captured view of the physical environment.

The example display systems described herein also may be implemented in devices other than HMD device 100. Examples of such devices may include other HMD devices, other wearable devices, mobile non-wearable devices, and stationary devices.

Figure 2A:
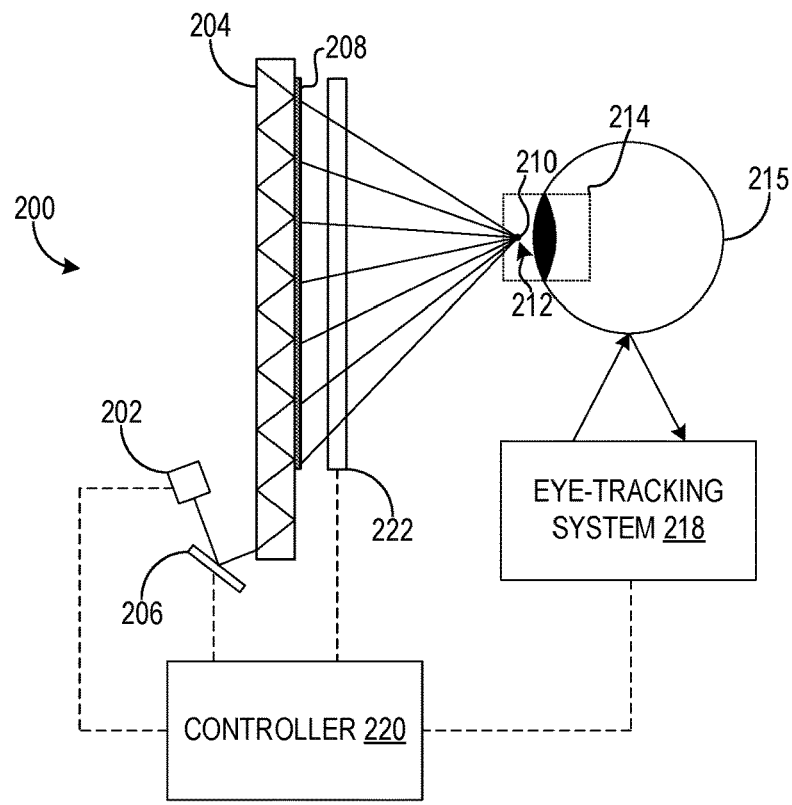
FIGS. 2A-2B show an example display system that may be implemented in the NED of FIG. 1.
Figure 2B:
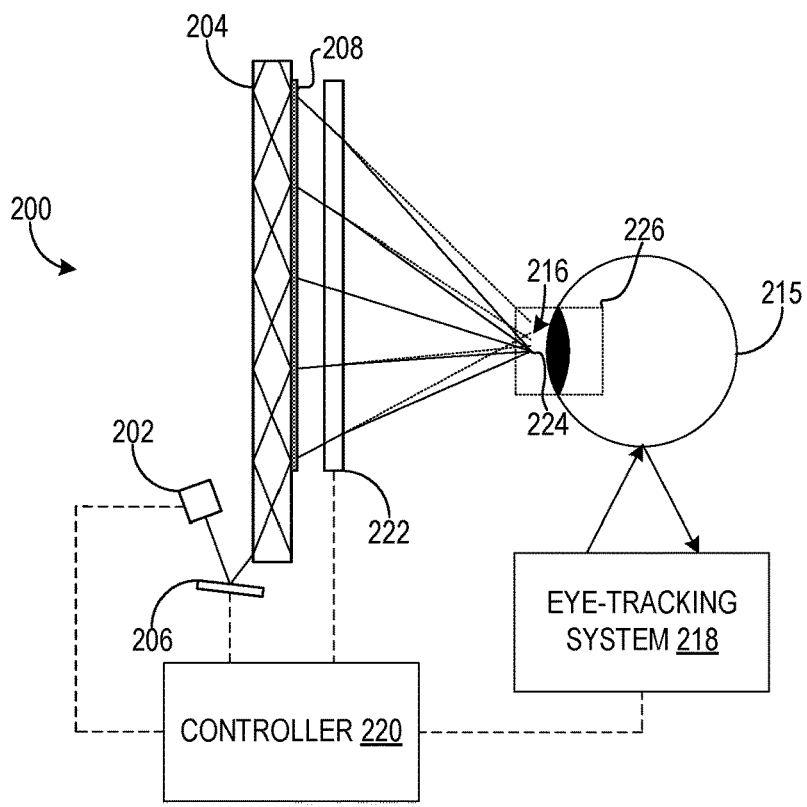

FIGS. 2A-2B show an example display system 200 that may be implemented in NED 104. Display system 200 is operable to variably position an exit pupil and provide a relatively large effective eyebox in which virtual imagery generated by the display system is viewable. Further, display system 200 is configured to correct for aberrations that may occur due to steering of the exit pupil to produce imagery substantially free of aberration. It will be understood that FIGS. 2A-2B show the example display system 200 schematically, and are not drawn to scale. FIGS. 3A-4B, 6 and 7 are similarly schematic in nature.

Display system 200 includes a light source 202 configured to introduce light into a waveguide 204 at a controllable angle. Light source 202 may output collimated light, which in some examples may be spatially modulated to create an image. Light source 202 may include any suitable optics for outputting light for creating and projecting images. The light source 202 further may include image-producing optics, such as a spatial light modulator for creating an image. The term "light source" is used herein as any suitable optics for outputting light to the other depicted components in the image, whether the light does or does not encode an image.

The input angle at which light is introduced into waveguide 204 may be controllable in various manners. As one example, FIGS. 2A-2B show a scanning mirror 206 controllable to change the angle at which light from light source 202 is introduced into waveguide 204 to steer an exit pupil of the display system 200. In other examples, different light sources arranged at different angles may be used to vary an input angle by selecting which light to use for illumination, or any other suitable method of varying a light input angle may be used. While not depicted in FIGS. 2A-2B, an in-coupling element may be provided to facilitate in-coupling of light into waveguide 204.

A HOE 208 coupled to waveguide 204 outcouples light received from within the waveguide that meets an angular condition of the HOE. HOE 208 may include, for example, a Bragg grating that diffracts light having a range of incident angles that satisfy the Bragg condition of the grating. FIG. 2A shows, for a first light input angle, light outcoupled by the HOE 208 being focused at a focal point 210 in an exit pupil 212. HOE 208 may encode optical power to focus the outcoupled light. For the first light input angle illustrated in FIG. 2A, the outcoupled, diffracted rays focused within exit pupil 212 form a substantially aberration-free image, which may be used to produce high-quality imagery in an eyebox 214, in which a user's pupil 215 is illustrated.

FIG. 2B shows light emitted by light source 202 introduced to waveguide 204 at a second angle different from the first angle shown in FIG. 2A. As the light is within a range of angles that can be diffracted by the HOE 208, this light is diffracted and outcoupled from the HOE toward an exit pupil 216 displaced from exit pupil 212. Thus, control of the light input angle may allow a range of exit pupil locations (and potentially a continuous range, depending upon how the light input angle is controlled) to be achieved. The output angle $\theta_{out}$ of light outcoupled from HOE 208 may be linearly related to the light input angle $\theta_{in}$ by the following relation: $\theta_{out} = \alpha\theta_{in} + \beta$, where $\alpha$ and $\beta$ are constants determined by the configuration of display system 200.

In some examples, display system 200 may vary the exit pupil location based on the location of a user's pupil. Thus, FIGS. 2A-2B show an eye-tracking system 218 configured to identify the location of a user's pupil. In some examples, eye-tracking system 218 may include a light source that projects light onto the eye, and an image sensor that captures light reflected from the cornea with which glints and/or other features can be identified to determine the pupil location. The pupil location identified by eye-tracking system 218 may be provided to a controller 220, which controls scanning mirror 206 to adjust the angle of the light input into waveguide 204.

However, in contrast with FIG. 2A, the light input angle of FIG. 2B leads to aberration in the image diffracted by HOE 208. In this example aberrated rays (represented by dashed lines) form a blur spot within exit pupil 216, which may appear as a blurry, distorted image at the exit pupil.

Thus, to correct for aberration at this and other light input angles, display system 200 includes a corrective component 222. Corrective component 222 may correct for the aberration arising from diffraction by HOE 208 at the second light input angle, such that all rays are focused at focal point 224, thereby forming non-aberrated imagery in eyebox 226. As shown in FIG. 2B, controller 220 is coupled to corrective component 222 to control the aberration correction based on the light input angle.

Corrective component 222 may take any suitable form. In some examples, corrective component 222 may include a phase modulating display panel, such as a transmissive liquid crystal panel or a reflective liquid crystal on silicon (LCOS) display. Such a display panel also may be implemented as a polarization modulating liquid crystal display (LCD) to allow for amplitude modulation via polarizing filters. In some examples, the display may be used to perform small-scale aberration corrections (e.g., the angle of incident rays may be modified up to 2 degrees in some examples), while larger-scale corrections, if desired, may be carried out by other element(s) such as an additional corrective element (e.g., liquid crystal lens or other adjustable power optical elements) arranged optically upstream or downstream of the display.

The use of a phase modulating panel allows the corrective component 222 to take the form of a dynamic digital hologram (DDH). The DDH further may apply optical power, as well as perform aberration correction and/or achieve a desired exit pupil position. This may allow a focal plane of the display system 200, and thus eye relief, to be adjusted. Alternatively or additionally, the DDH may form at least a portion of the imagery that is provided to an eyebox. For example, the DDH may be logically partitioned into a plurality of digital holograms that each form part of an image using light from HOE 208. The plurality of digital holograms may be formed by partitioning a single image producing panel and/or by providing multiple separate image producing panels. The DDH may be configured to produce imagery via first order diffracted light, and/or through the use of other orders of diffracted light. For implementations in which the DDH performs both aberration correction and image formation, the holographic bandwidth (e.g., the range of incident angles that meet the Bragg condition) of the DDH may be selectively allocated to each task, as both correction and formation consume such bandwidth. Aberration correction may be relatively limited to achieve desired image formation, for example.

Display system 200 may include other corrective elements alternatively to or in addition to a phase or amplitude modulating panel. As examples, other corrective elements may include a liquid crystal (LC) lens, a micromirror array, and a deformable mirror. Yet other approaches to aberration correction are described below with reference to FIG. 3, which shows the use of a shearable HOE, and with reference to FIG. 7, which shows the use of a wavefront modulating device (WMD).

In some examples, waveguide 204 may have another geometry than the flat, rectangular shape shown in FIGS. 2A-2B. For example, the waveguide may have the shape of a wedge or a curved wedge. Moreover, the focusing of light outcoupled from waveguide 204 provided by optical power encoded in HOE 208 may instead be provided by a lens. However, optical power encoded in HOE 208 may enable the addition of Zernike coefficients and/or the direction of diffracted light onto a surface suited for movement of a user's pupil. The encoded optical power may also increase the field of view in a generated eyebox, though with a reduction in the size of an exit pupil. By variably positioning the exit pupil, however, the correspondence between exit pupil location and user pupil location may be maintained.

The light from light source 202 may be substantially monochromatic or multi-color (e.g., red, green, blue). In some examples that utilize multi-color light, light source 202 may perform color field-sequential display. For implementations in which a DDH is used, corrective component 222 may be independently controlled for each color channel to provide aberration correction suited for each color channel.

In some examples, it may be desirable to position the exit pupil of display system 200 at a position different from a user's pupil, and/or to introduce aberrations that cancel aberrations that might otherwise be present at the user's pupil.

Figure 3A:
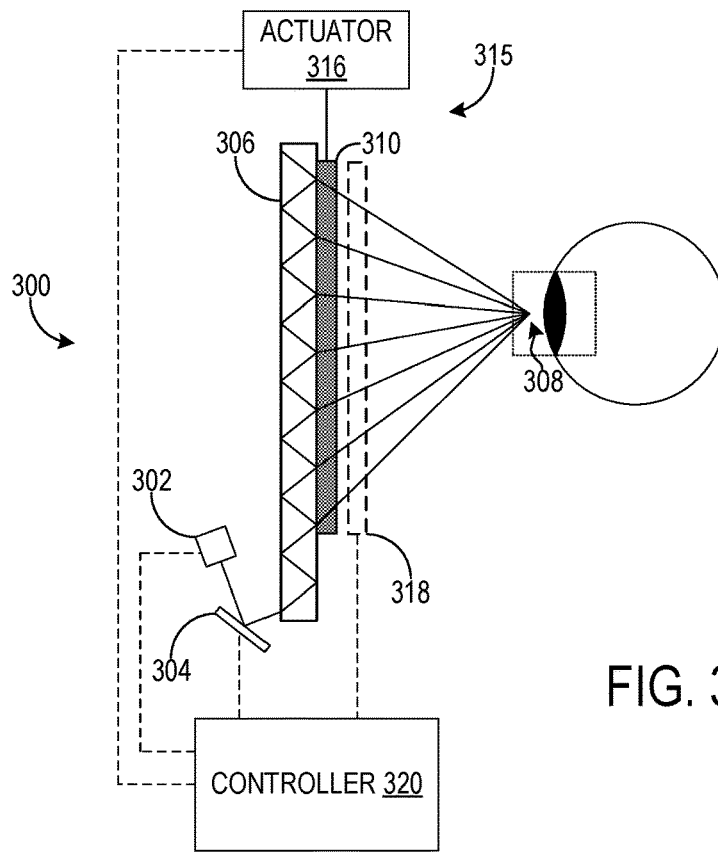
FIGS. 3A-3B show another example display system that may be implemented in the NED of FIG. 1.
Figure 3B:
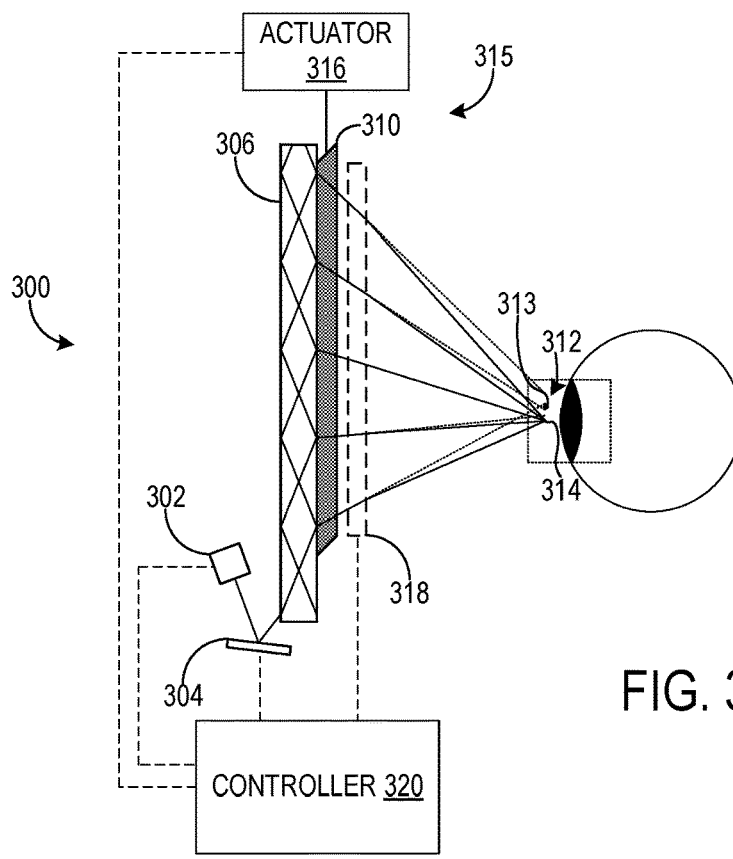

FIGS. 3A-3B show another example display system 300 that may be used in NED 104. Display system 300 includes a light source 302 and a scanning mirror 304 configured to introduce light into a waveguide 306 at a controllable angle, as described above. Light input to waveguide 306 at a first input angle shown in FIG. 3A produces aberration-free imagery at an exit pupil 308 when diffracted by a HOE 310, which outcouples from the waveguide light that meets an angular condition of the HOE.

The light input angle is controllable to adjust the exit pupil location in display system 300. FIG. 3B shows the introduction of light into waveguide 306 at a second input angle, which produces imagery within an exit pupil 312 displaced from exit pupil 308. In contrast to FIG. 3A, the imagery produced at exit pupil 312 is aberrated relative to a desired focal point 313.

Thus, to correct for aberration at this and other light input angles, display system 300 includes a corrective component 315. Corrective component 315 includes a mechanical actuator 316 configured to controllably shear HOE 310. When sheared with a force selected based on the second light input angle, HOE 310 produces diffracted rays that are focused at a focal point 314 that is different than focal point 313 produced by the unsheared state of the HOE, thereby correcting for the aberration. Aberrations for other pupil locations similarly may be adjusted by applying corresponding shearing forces to HOE 310. Such shearing may adjust the Bragg condition of HOE 310 and in turn change the diffraction angle of outcoupled light. Shearing of HOE 310 also may be used to perform relatively fine adjustments to the exit pupil location, alternatively or in addition to correcting aberration.

Shear force may be applied to HOE 310 in any suitable manner. In one example, the diffractive optics of HOE 310 are interposed between and attached to substrates made of glass or other suitable materials. The diffractive optics may include a volume hologram having a thickness between 5 and 1500 microns, for example. An actuator 316 may be coupled to one of the substrates to selectively deflect the substrate and thereby apply a shear force to the diffractive optics. In some examples, actuator 316 may comprise one or more actuators (e.g., piezoelectric crystals) configured to deflect the substrate along a single axis, while in other examples actuators may be provided to deflect the substrate along multiple axes (e.g., perpendicular x and y axes), which may enable aberration correction and/or exit pupil placement in two directions. In a more specific example, actuator 316 may apply adjustments on the order of one micron to HOE 310.

In some implementations, display system 300 further may include a corrective component 318, such as those described above with reference to corrective component 222 of FIG. 2, which may be controlled in combination with the shearing of HOE 310 to perform aberration correction and/or adjust exit pupil location. As such, a controller 320 may be coupled to corrective component 318 and actuator 316, among other elements of display system 300. As described above, corrective component 318 may include a phase modulating and/or amplitude (e.g., polarization) modulating display panel such as a DDH.

Figure 4A:
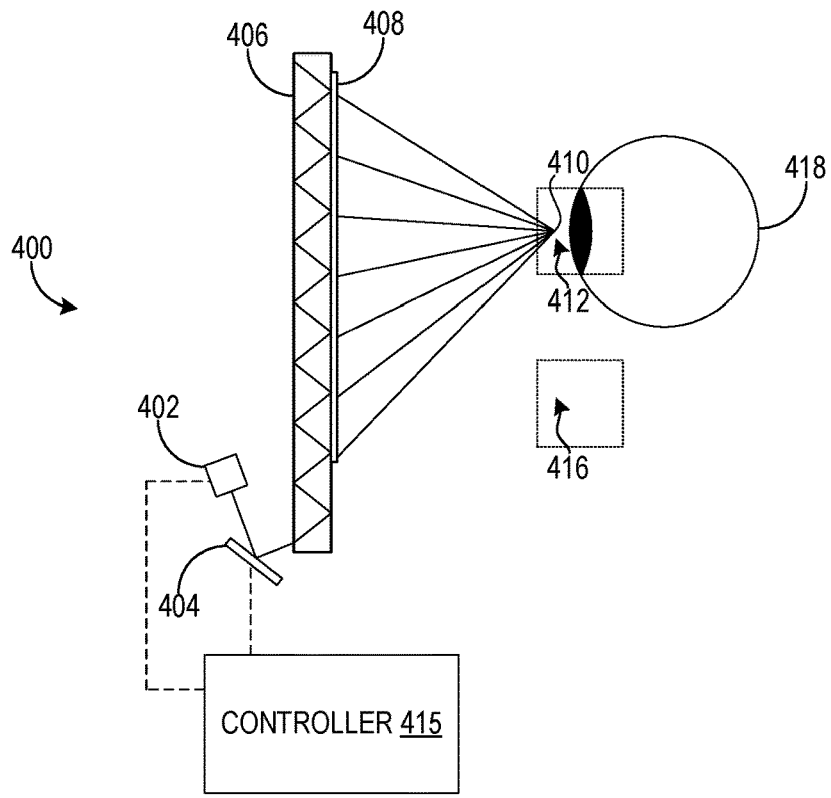
FIGS. 4A-4B show another example display system that may be implemented in the NED of FIG. 1.
Figure 4B:
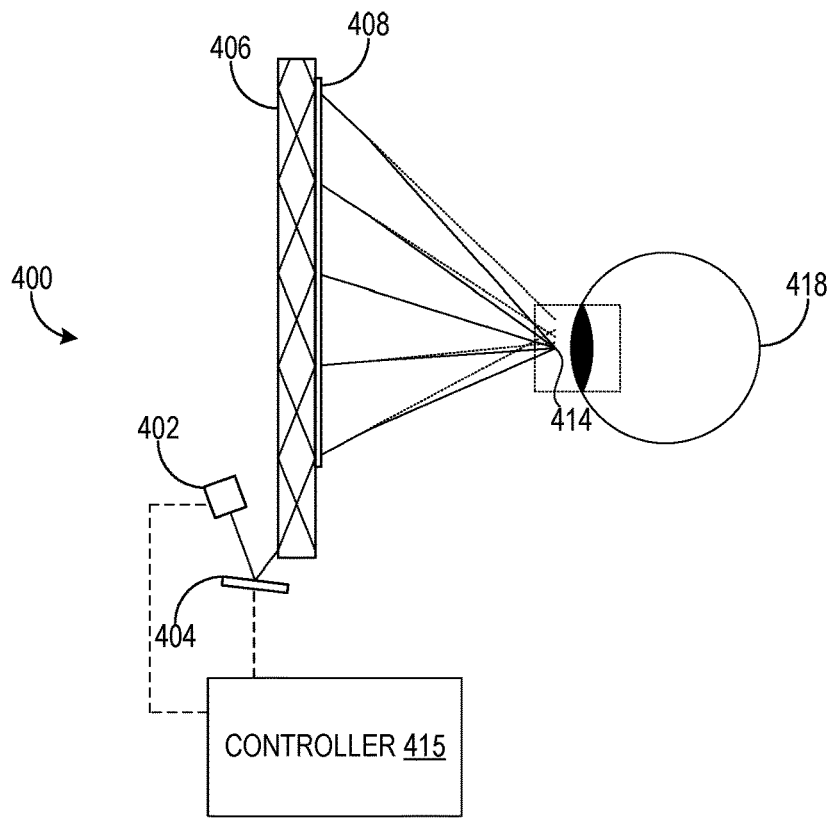

FIGS. 4A-4B show another example display system 400 that may be used in NED 104. Display system 400 includes a light source 402 and a scanning mirror 404 configured to introduce light into a waveguide 406 at a controllable angle, as described above. In other examples, multiple light sources may be used to vary an input angle by varying which light source is used to provide light to waveguide 406, rather than scanning optics. The scanning mirror may take any suitable form, such as a microelectromechanical system (MEMS) mirror.

Display system 400 further includes a HOE 408 coupled to waveguide 406, wherein the HOE comprises angularly multiplexed holograms. Each hologram of the angularly multiplexed holograms is configured to meet the Bragg condition for different angles of incident light, and to diffract light toward a respective exit pupil. FIG. 4A shows, for a first light input angle, light diffracted by a first hologram that is focused at a focal point 410 within a first exit pupil 412. Likewise, FIG. 4B shows, for a second light input angle, light diffracted by a second hologram of HOE 408 that is focused at a different focal point 414. By matching the angle of light incident on HOE 408 to an acceptance range for a desired hologram of the HOE, outcoupled light can be selectively steered among exit pupils in an aberration-free manner. As such, a controller 415 may control the light input angle to achieve a hologram-specific incidence angle. As described in more detail below, the light input angles may be selected to reduce crosstalk between angularly adjacent holograms.

In this example, the output angle $\theta_{out}$ of light diffracted by HOE 408 may be related to the angle $\theta_{in}$ of light incident on the HOE by a functional relation of the following form: $\theta_{out}=F(\theta_{in})$, as opposed to the linear relationship described above for the HOEs of FIGS. 2A-B and 3A-B. $F(\theta_{in})$ may be a function determined by HOE 408, and may be represented by a matrix. With this relation, a relatively small change in $\theta_{in}$ may cause a relatively larger change in $\theta_{out}$. In these examples, $\theta_{out}$ may comprise a discrete set of output angles associated with each hologram encoded in HOE 408. In comparison, other display systems that use a thin hologram (e.g., HOE 208 and/or 310) may provide a continuous range of output angles. In some examples, an additional pupil steering mechanism (e.g. modulation via a DDH) may be used to provide additional output angles beyond the exit pupil steering provided by hologram selection in HOE 408 alone.

Figure 5:
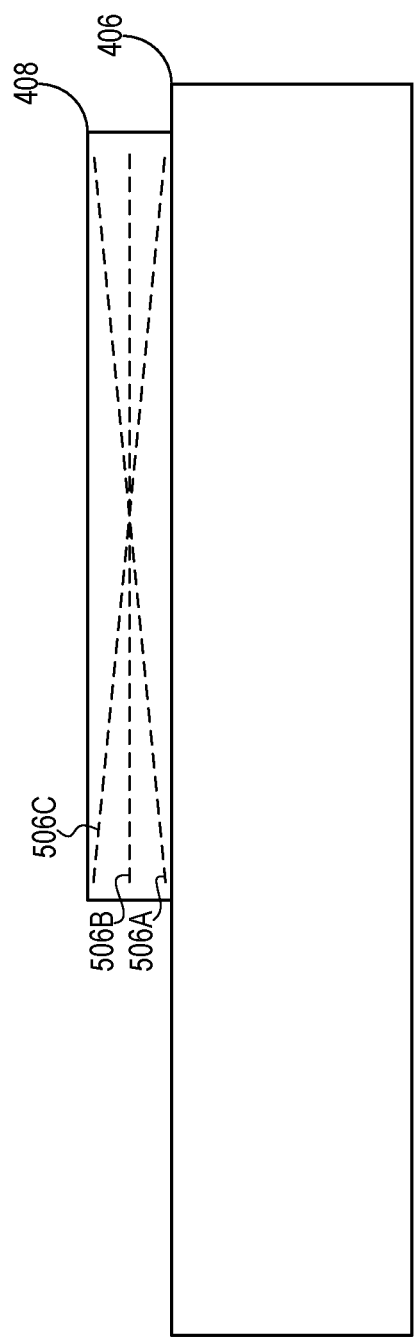
FIG. 5 shows a cross-sectional view of a waveguide and a holographic optical element (HOE).

FIG. 5 shows a schematic depiction of three multiplexed holograms 506A, 506B, and 506C in HOE 408. Each hologram 506A-C includes a respective angular acceptance range or bandwidth—e.g., the range of incidence angles at which the Bragg condition is met—and a respective exit pupil toward which the hologram diffracts light. The total range of light input angles and incidence angles sufficient to access each hologram 506 may be a function of the number of holograms in HOE 408 and the angular acceptance range for each hologram. As such, angular acceptance, hologram number, and total angular range sufficient to access each hologram may be balanced in HOE 408 to achieve desired optical performance. Further, HOE 408 may include multiple holograms designed for the same incidence angles but different wavelengths of light. For example, HOE 408 may include three holograms designed for the same incidence angles but configured to diffract light in red, green, and blue wavelength ranges, respectively.

In some examples, one or more of the multiplexed holograms may be configured to diffract light toward multiple exit pupils. As an example, FIG. 4A shows a second exit pupil 416 toward which the first hologram of HOE 408 may be configured to diffract light, in addition to diffracting light toward exit pupil 412. Exit pupil 416 may be separated from exit pupil 412 by a distance based on a maximum human pupil size, for example, such that a user's pupil 418 avoids perceiving imagery in both exit pupils at the same time. In one specific example, a separation distance of 10 mm may be used. While configuring a hologram to diffract light toward multiple exit pupils may expand the range of possible exit pupil locations, a reduction in brightness may result from the distribution of diffracted light among the exit pupils. As such, the HOEs described herein that encode multiple holograms may be configured to balance desired brightness, hologram number, and exit pupil range.

Figure 6:
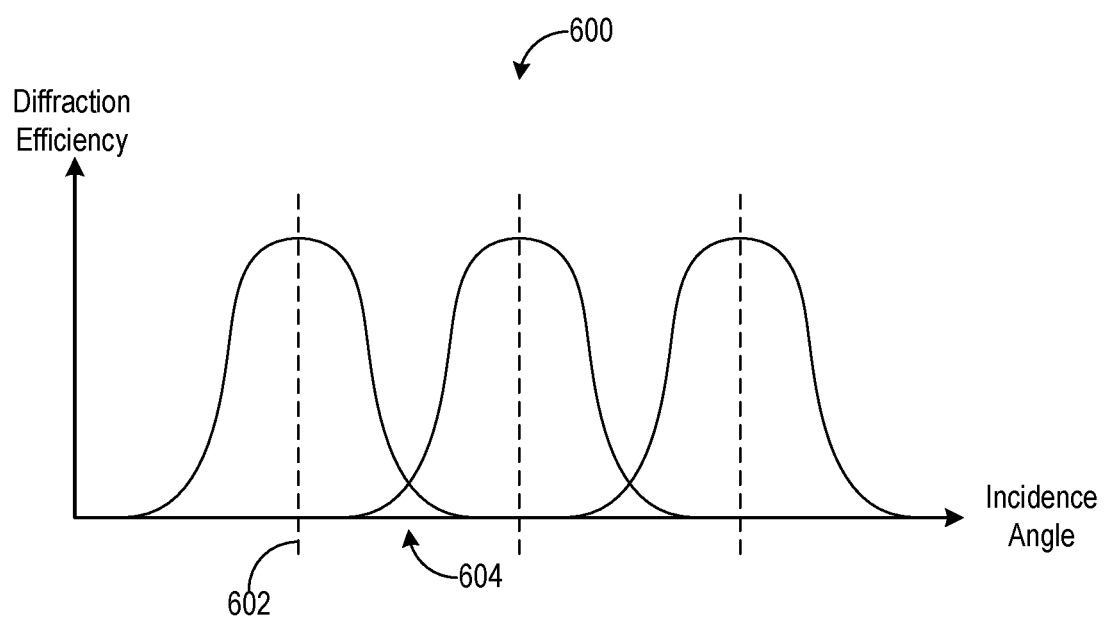
FIG. 6 shows a graph illustrating the spectral response of holograms encoded in a HOE.

FIG. 6 shows a graph 600 illustrating an example spectral response of three holograms encoded in a HOE, such as HOE 408. The diffraction efficiency of each hologram is shown as a function of the light incidence angle. Light input angles at or near the central angle for each hologram may achieve a suitably high diffraction efficiency from a desired hologram while avoiding diffraction from angularly adjacent holograms. FIG. 6 also illustrates incidence angle ranges (e.g., range 604) where the spectral response of adjacent holograms overlaps. Light incident in these ranges may be diffracted by two holograms, resulting in image formation at both exit pupils corresponding to each hologram. To avoid such crosstalk, controller 415 may avoid the use of light input angles corresponding to angular regions at which the spectral response of holograms overlap.

Various modifications to display system 400 may be made. For example, one or more of the corrective components described above may be used to adjust exit pupil location and/or correct aberrations, including but not limited to a DDH, LC lens, and a WMD. As another example, display system 400 may include eye-tracking system 218 of FIGS. 2A-2B for matching the exit pupil location to the location of the user's pupil 418. Controller 220 may control scanning mirror 206 such that light is steered to the hologram having an exit pupil corresponding to the user's pupil 418.

Figure 7:
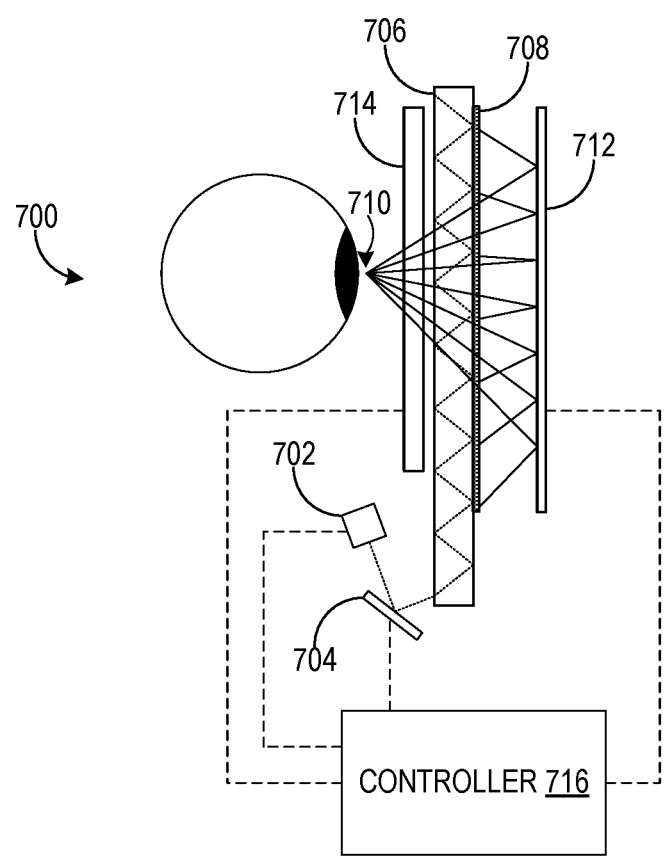
FIG. 7 shows another example display system that may be implemented in the NED of FIG. 1.

FIG. 7 shows another example display system 700 that may be implemented in NED 104. Display system 700 includes a light source 702 and a scanning mirror 704 configured to introduce light into a waveguide 706 at a controllable angle, as described above. A HOE 708 is configured to outcouple light received from within waveguide 706 that meets an angular condition of the HOE and diffract the light for eventual focusing within an exit pupil 710, which corresponds to the light input angle shown in FIG. 7. HOE 708 may be a thin hologram that enables continuous exit pupil positioning, for example.

Display system 700 further comprises a wavefront modulating device (WMD) 712 configured to redirect light diffracted from HOE 708. WMD 712 may be controlled to perform aberration correction and/or steering errors. To this end, WMD 712 may include any suitable corrective components, including but not limited to an LC lens, an adjustable Fresnel lens, a micromirror array (e.g., positioned in a polar array, rectangular array, or other suitable arrangement), a tiltable mirror, and/or a continuously deformable mirror. As shown, WMD 712 may apply optical power in reflecting rays received from HOE 708 to produce converging light, though in other implementations the WMD may produce collimated light. Further, WMD 712 may be configured to reflect or transmit light received from HOE 708.

Light from WMD 712 is transmitted through a display 714, which may steer, correct, and/or modulate such light. For example, display 714 form a portion of the imagery generated at exit pupil 710. Display 714 may include a phase modulating display panel, or may assume any other suitable configuration. Further, display system 700 includes a controller 716 for controlling one or more of the components described above.

Figure 8:
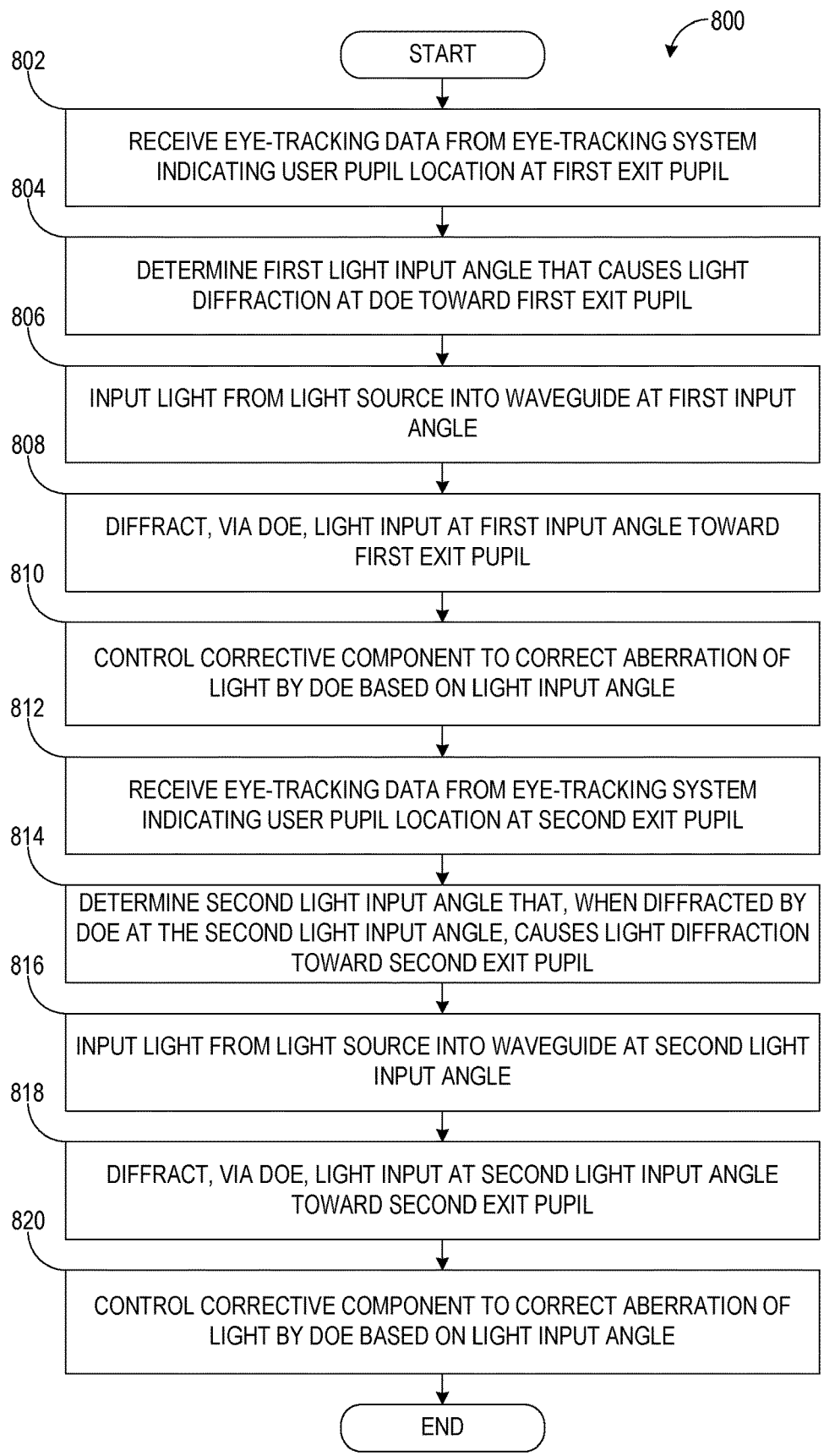
FIG. 8 shows a flowchart illustrating a method of correcting aberration in a display system.

FIG. 8 shows a flowchart illustrating a method 800 of correcting aberration in a display system. Method 800 may be implemented in one or more of the display systems described herein, for example.

At 802, method 800 includes receiving eye-tracking data from an eye-tracking system indicating the location of a user's pupil at a first exit pupil of the display system. At 804, method 800 includes determining a first light input angle that causes light diffraction at a HOE toward the first exit pupil. The first light input angle may be an angle that causes light input into the waveguide to arrive at the HOE at a corresponding first angle of incidence at which the HOE diffracts the light toward the first exit pupil. The HOE may be configured to outcouple and diffract light received from within the waveguide that meets an angular condition of the HOE, such as light incident at the first angle of incidence.

At 806, method 800 includes inputting light from a light source into the waveguide at the first light input angle. At 808, method 800 includes diffracting, via the HOE, the light input at the first light input angle toward the first exit pupil.

At 810, method 800 includes controlling a corrective component optically downstream of the HOE to correct for aberration of the light by the HOE based on the first light input angle. The corrective component may include one or more of a phase modulating display panel such as a DDH, a mechanical actuator coupled to the HOE and configured to controllably shear the HOE based on the first light input angle, a WMD, an LC lens, a deformable mirror, a micromirror array, an adjustable Fresnel lens, and a tiltable mirror, as examples.

At 812, method 800 includes receiving eye-tracking data from an eye-tracking system indicating the location of a user's pupil at a second exit pupil of the display system. At 814, method 800 includes determining a second light input angle that causes light diffraction at the HOE toward the second exit pupil. The second light input angle may be an angle that causes light input into the waveguide to arrive at the HOE at a corresponding second angle of incidence at which the HOE diffracts the light toward the second exit pupil. The HOE may be configured to outcouple and diffract light received from within the waveguide that meets an angular condition of the HOE, such as light incident at the second angle of incidence.

At 816, method 800 includes inputting light from the light source into the waveguide at the second light input angle. At 818, method 800 includes diffracting, via the HOE, light input at the second light input angle toward the second exit pupil. At 820, method 800 includes controlling the corrective component to correct for aberration of the light by the HOE based on the second light input angle.

Figure 9:
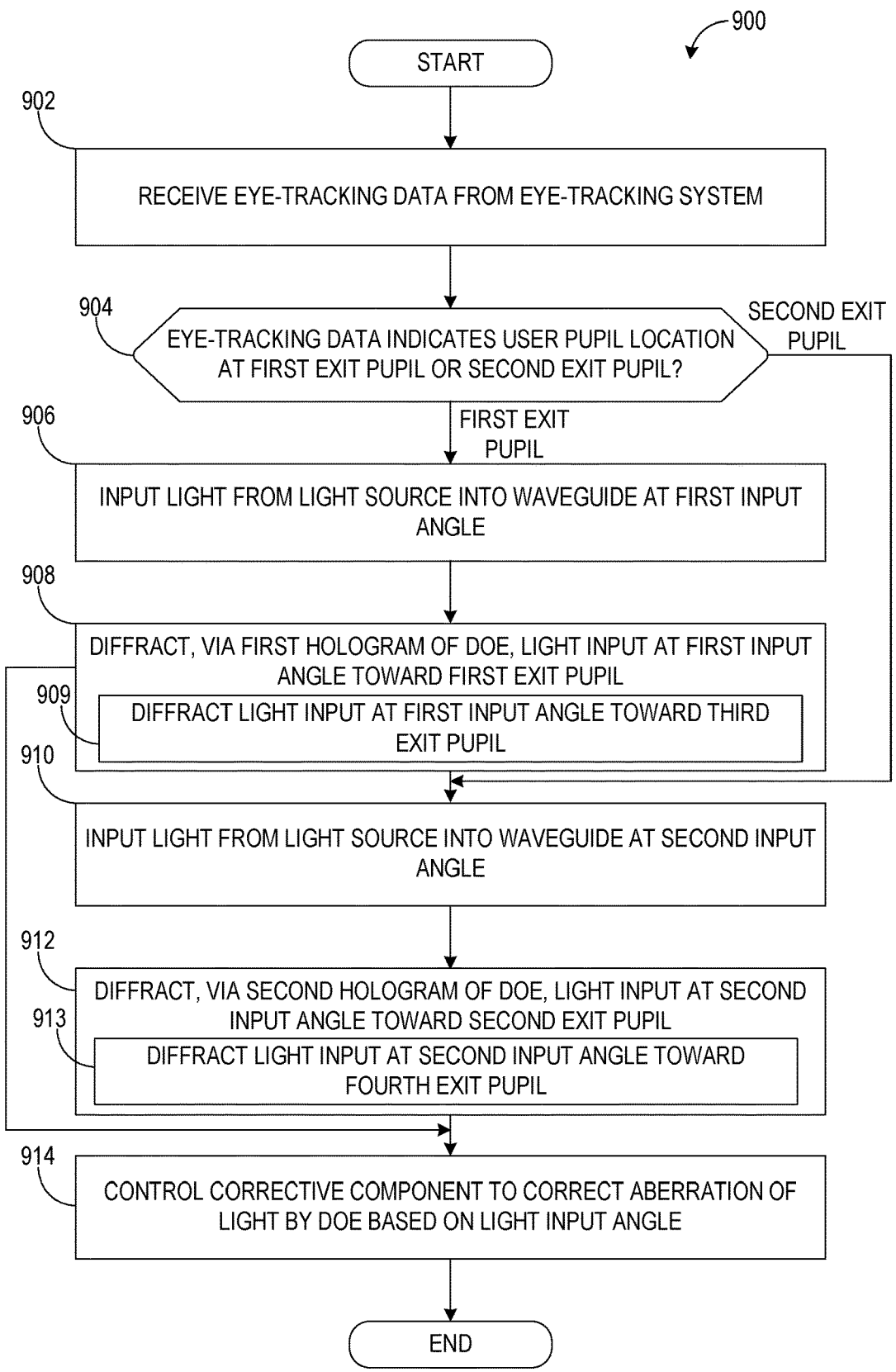
FIG. 9 shows a flowchart illustrating a method of steering diffracted light among exit pupils in a display system.

FIG. 9 shows a flowchart illustrating a method 900 of steering light among exit pupils in a display system. Method 900 may be implemented in one or more of the display systems described herein, for example. At 902, method 900 includes receiving eye-tracking data from an eye-tracking system, and at 904, determining whether the eye-tracking data indicates the location of a user pupil at a first exit pupil of the display system or a second exit pupil of the display system. If the eye-tracking data indicates the user pupil location at the first exit pupil (FIRST EXIT PUPIL), method 900 proceeds to 906. If the eye-tracking data indicates the user pupil location at the second exit pupil (SECOND EXIT PUPIL), method 900 proceeds to 910.

At 906, method 900 includes inputting light from a light source into a waveguide at a first light input angle. At 908, method 900 includes diffracting, via a first hologram of a HOE, the light input at the first light input angle toward the first exit pupil. The first light input angle may be an angle that causes light input into the waveguide to arrive at the HOE at a corresponding first angle of incidence at which the HOE diffracts the light toward the first exit pupil via the first hologram. The HOE may be configured to outcouple and diffract light received from within the waveguide that meets an angular condition of a hologram of the HOE. As indicated at 909, the light input at the first light input angle may be optionally diffracted via the first hologram of the HOE toward a third exit pupil, in addition to being diffracted toward the first exit pupil. Following 908, method 900 proceeds to 914.

At 910, method 900 includes inputting light from the light source into the waveguide at a second input angle, and at 912, diffracting, via a second hologram of a HOE, the light input at the second light input angle toward the second exit pupil. The second light input angle may be an angle that causes light input into the waveguide to arrive at the HOE at a corresponding second angle of incidence at which the HOE diffracts the light toward the second exit pupil via the second hologram. As indicated at 912, the light input at the second light input angle may be optionally diffracted via the second hologram of the HOE toward a fourth exit pupil, in addition to being diffracted toward the second exit pupil. Further, at 914, method 900 includes controlling a corrective component optically downstream of the HOE to correct for aberration of the light by the HOE based on the light input angle.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
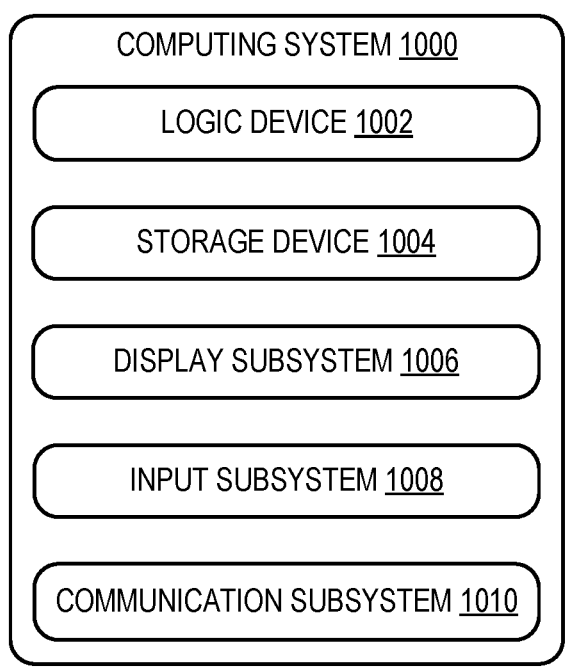
FIG. 10 shows a block diagram of an example computing device.

FIG. 10 schematically shows a non-limiting embodiment of a computing system 1000 that can enact one or more of the methods and processes described above. Computing system 1000 is shown in simplified form. Computing system 1000 may take the form of one or more personal computers, server computers, tablet computers, home-entertainment computers, network computing devices, gaming devices, mobile computing devices, mobile communication devices (e.g., smart phone), and/or other computing devices.

Computing system 1000 includes a logic machine 1002 and a storage machine 1004. Computing system 1000 may optionally include a display subsystem 1006, input subsystem 1008, communication subsystem 1010, and/or other components not shown in FIG. 10.

Logic machine 1002 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1004 includes one or more physical devices configured to hold instructions executable by the logic machine to implement the methods and processes described herein. When such methods and processes are implemented, the state of storage machine 1004 may be transformed—e.g., to hold different data.

Storage machine 1004 may include removable and/or built-in devices. Storage machine 1004 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1004 may include volatile, nonvolatile, dynamic, static, read/write, read-only, random-access, sequential-access, location-addressable, file-addressable, and/or content-addressable devices.

It will be appreciated that storage machine 1004 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1002 and storage machine 1004 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1000 implemented to perform a particular function. In some cases, a module, program, or engine may be instantiated via logic machine 1002 executing instructions held by storage machine 1004. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1006 may be used to present a visual representation of data held by storage machine 1004. This visual representation may take the form of a graphical user interface (GUI). As the herein described methods and processes change the data held by the storage machine, and thus transform the state of the storage machine, the state of display subsystem 1006 may likewise be transformed to visually represent changes in the underlying data. Display subsystem 1006 may include one or more display devices utilizing virtually any type of technology. Such display devices may be combined with logic machine 1002 and/or storage machine 1004 in a shared enclosure, or such display devices may be peripheral display devices.

When included, input subsystem 1008 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1010 may be configured to communicatively couple computing system 1000 with one or more other computing devices. Communication subsystem 1010 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1000 to send and/or receive messages to and/or from other devices via a network such as the Internet.

Another example provides a display system comprising a waveguide, a light source configured to introduce light into the waveguide at a controllable light input angle, a holographic optical element (HOE) configured to outcouple from the waveguide light received from within the waveguide that meets an angular condition, and a controller configured to control the light input angle and also to control a corrective component optically downstream of the HOE to correct for aberration of the light by the HOE based upon the light input angle. In such an example, the corrective component alternatively or additionally may include a dynamic digital hologram. In such an example, the corrective component alternatively or additionally may include a liquid crystal lens. In such an example, the corrective component alternatively or additionally may include a mechanical actuator configured to controllably shear the HOE. In such an example, the corrective component alternatively or additionally may include a wavefront modulating device. In such an example, the corrective component alternatively or additionally may include a micromirror array. In such an example, the corrective component alternatively or additionally may include a deformable mirror. In such an example, the display system alternatively or additionally may comprise an eye-tracking system configured to identify a user pupil location, and the controller alternatively or additionally may be configured to control the light input angle based upon eye-tracking data from the eye-tracking system to change an exit pupil location. In such an example, the controller alternatively or additionally may be configured to control the corrective component differently for light emitted by the light source in a first wavelength range from light emitted by the light source in a second wavelength range. In such an example, the display system alternatively or additionally may comprise a near-eye display.

Another example provides a display system comprising a light source, a waveguide positioned to receive light emitted by the light source, a holographic optical element (HOE) comprising a first hologram and a second hologram, the first hologram configured to diffract light received at the HOE from within the waveguide at a first angle toward a first exit pupil, and the second hologram configured to diffract light received at the HOE from within the waveguide at a second angle toward a second exit pupil, and a controller configured to cause light to be selectively directed toward the first exit pupil via the first hologram or the second exit pupil via the second hologram by controlling an angle at which light from the light source enters the waveguide. In such an example, the first hologram alternatively or additionally may be configured to diffract light toward a third exit pupil in addition to diffracting light toward the first exit pupil. In such an example, the first exit pupil alternatively or additionally may be separated from the third exit pupil by a distance based on an maximum human pupil size. In such an example, the display system alternatively or additionally may comprise an eye-tracking system configured to identify a user pupil location, and the controller alternatively or additionally may be configured to cause light to be selectively directed toward the first exit pupil or the second exit pupil based upon eye-tracking data from the eye-tracking system. In such an example, the display system alternatively or additionally may comprise a corrective component, and the controller alternatively or additionally may be configured to control the corrective component to cause light emitted by the HOE to be redirected toward the first exit pupil or the second exit pupil to reduce aberration of the light emitted by the HOE. In such an example, the corrective component alternatively or additionally may include one or both of a dynamic digital hologram and a liquid crystal lens. In such an example, the corrective component alternatively or additionally may include a wavefront modulating device. In such an example, the controller alternatively or additionally may be configured to control the corrective component differently for light emitted by the light source in a first wavelength range from light emitted by the light source in a second wavelength range.

Another example provides a method comprising inputting light from a light source into a waveguide at a first input angle, diffracting, via a first hologram of a holographic optical element (HOE), the light input at the first input angle toward a first exit pupil, inputting light from the light source into the waveguide at a second input angle, and diffracting, via a second hologram of the HOE, the light input at the second input angle toward a second exit pupil. In such an example, the method alternatively or additionally may comprise selectively switching between inputting light at the first input angle and the second input angle based upon eye-tracking data from an eye-tracking system.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A display system, comprising:
a light source;
a scanning mirror positioned to receive light emitted by the light source;
a waveguide positioned to receive light reflected by the scanning mirror;
a holographic optical element (HOE) comprising a first hologram and a second hologram, the first hologram configured to diffract light received at the HOE from within the waveguide at a first input angle in a first range of input angles toward a first exit pupil at a first output angle, and the second hologram configured to diffract light received at the HOE from within the waveguide at a second input angle in a second range of input angles toward a second exit pupil at a second output angle different from the first output angle;
an eye-tracking system configured to identify a user pupil location; and
a controller configured to cause light to be selectively directed toward one of the first exit pupil via the first hologram or the second exit pupil via the second hologram by controlling an angle of the scanning mirror to control an angle at which light reflected by the scanning mirror enters the waveguide based upon eye-tracking data from the eye-tracking system.

2. The display system of claim 1, wherein the first hologram is further configured to diffract light toward a third exit pupil in addition to diffracting light toward the first exit pupil.

3. The display system of claim 2, wherein the first exit pupil is separated from the third exit pupil by a distance based on a maximum human pupil size.

4. The display system of claim 1, further comprising a corrective component, wherein the controller is further configured to control the corrective component to cause light emitted by the HOE to be redirected toward the first exit pupil or the second exit pupil to reduce aberration of the light emitted by the HOE.

5. The display system of claim 4, wherein the corrective component includes one or both of a dynamic digital hologram and a liquid crystal lens.

6. The display system of claim 4, wherein the corrective component includes a wavefront modulating device.

7. The display system of claim 4, wherein the controller is further configured to control the corrective component differently for light emitted by the light source in a first wavelength range from light emitted by the light source in a second wavelength range.

8. A method, comprising:
inputting light emitted from a light source and reflected by a scanning mirror into a waveguide at a first input angle in a first range of input angles;
diffracting, via a first hologram of a holographic optical element (HOE), the light input at the first input angle toward a first exit pupil at a first output angle;
inputting light emitted from the light source and reflected by the scanning mirror into the waveguide at a second input angle in a second range of input angles;
diffracting, via a second hologram of the HOE, the light input at the second input angle toward a plurality of exit pupils, the plurality of exit pupils including a second exit pupil toward which the light input at the second angle is diffracted at a second output angle different from the first output angle; and
selectively switching between inputting light at the first input angle and the second input angle based upon eye-tracking data from an eye-tracking system by controlling an angle of the scanning mirror to thereby switch between directing light toward the first exit pupil via the first hologram or the plurality of exit pupils via the second hologram.

9. The method of claim 8, wherein the plurality of exit pupils is a second plurality of exit pupils, wherein the first exit pupil is included within a first plurality of exit pupils, and wherein diffracting, via the first hologram of the HOE, the light input at the first input angle toward the first exit pupil comprises diffracting the light input at the first input angle toward each exit pupil of the first plurality of exit pupils.

10. A display system, comprising:
a waveguide;
a plurality of light sources configured to input light into the waveguide from a plurality of different angles;
a holographic optical element (HOE) comprising a first hologram and a second hologram, the first hologram configured to diffract light received at the HOE from within the waveguide at a first input angle in a first range of input angles toward a first exit pupil at a first output angle, and the second hologram configured to diffract light received at the HOE from within the waveguide at a second input angle in a second range of input angles toward a second exit pupil at a second output angle different from the first output angle;

an eye-tracking system configured to identify a user pupil location; and a controller configured to cause light to be selectively directed toward one of the first exit pupil via the first hologram or the second exit pupil via the second hologram by controlling which of the plurality of light sources emit light.

11. The display system of claim 10, wherein the first hologram is further configured to diffract light toward a third exit pupil in addition to diffracting light toward the first exit pupil.

12. The display system of claim 11, wherein the first exit pupil is separated from the third exit pupil by a distance based on a maximum human pupil size.

13. The display system of claim 10, further comprising a corrective component, wherein the controller is further configured to control the corrective component to cause light emitted by the HOE to be redirected toward the first exit pupil or the second exit pupil to reduce aberration of the light emitted by the HOE.

14. The display system of claim 13, wherein the corrective component includes one or both of a dynamic digital hologram and a liquid crystal lens.

15. The display system of claim 13, wherein the corrective component includes a wavefront modulating device.

16. The display system of claim 13, wherein the controller is further configured to control the corrective component differently for light emitted by the light source in a first wavelength range from light emitted by the light source in a second wavelength range.

* * * * *